US008986648B2

(12) United States Patent
Aymes et al.

(10) Patent No.: US 8,986,648 B2
(45) Date of Patent: Mar. 24, 2015

(54) PARTICLE SYNTHESIS BY MEANS OF THE THERMOHYDROLYSIS OF MINERAL PRECURSORS

(75) Inventors: Daniel Aymes, Brazey-en-Plaine (FR); Moustapha Ariane, Questigny (FR); Frédéric Bernard, Neuilly-les-Dijon (FR); Hervé Muhr, Champigneulles (FR); Frédéric Demoisson, Dijon (FR)

(73) Assignees: Centre National de la Recherche Scientifique (C.N.R.S.), Paris (FR); Universite de Bourgogne, Esplande Erasme (FR)

( * ) Notice: Subject to any disclaimer, the term of this patent is extended or adjusted under 35 U.S.C. 154(b) by 0 days.

(21) Appl. No.: 13/384,703

(22) PCT Filed: Jul. 20, 2010

(86) PCT No.: PCT/FR2010/051520
§ 371 (c)(1),
(2), (4) Date: Apr. 2, 2012

(87) PCT Pub. No.: WO2011/010056
PCT Pub. Date: Jan. 27, 2011

(65) Prior Publication Data
US 2012/0183470 A1 Jul. 19, 2012

(30) Foreign Application Priority Data

Jul. 20, 2009 (FR) ..................................... 09 55023

(51) Int. Cl.
| | | |
|---|---|---|
| *C01B 13/00* | (2006.01) | |
| *B01J 2/02* | (2006.01) | |
| *B01J 2/06* | (2006.01) | |
| *B82Y 30/00* | (2011.01) | |
| *C01B 13/36* | (2006.01) | |
| *C01G 9/02* | (2006.01) | |
| *C01G 23/047* | (2006.01) | |
| *C01G 25/02* | (2006.01) | |
| *C01G 49/02* | (2006.01) | |

(52) U.S. Cl.
CPC .... *B01J 2/02* (2013.01); *B01J 2/06* (2013.01); *B82Y 30/00* (2013.01); *C01B 13/36* (2013.01); *C01G 9/02* (2013.01); *C01G 23/047* (2013.01); *C01G 25/02* (2013.01); *C01G 49/02* (2013.01); *B01J 2219/00123* (2013.01); *C01P 2004/64* (2013.01)
USPC ........ 423/592.1; 423/608; 423/622; 423/632; 423/263

(58) Field of Classification Search
USPC .................................. 423/592.1–594.19, 263
See application file for complete search history.

(56) References Cited

U.S. PATENT DOCUMENTS

| | | | | |
|---|---|---|---|---|
| 1,920,886 | A | * | 8/1933 | Pier et al. ....................... 208/107 |
| 2007/0206435 | A1 | | 9/2007 | Lester et al. |
| 2008/0138262 | A1 | * | 6/2008 | Brooks et al. ................. 423/138 |

FOREIGN PATENT DOCUMENTS

| | | |
|---|---|---|
| FR | 837410 | 2/1939 |
| JP | 52-6113 | 1/1977 |
| JP | 05-310425 | 11/1993 |
| JP | 2007-526113 A | 9/2007 |
| WO | WO 2005/077505 A2 | 8/2005 |

OTHER PUBLICATIONS

Reverchon, et al., "Nanomaterials and supercritical fluids" J. of Supercritical Fluids 37 (2006) pp. 1-22.*
Lester et al., "Reaction engineering: The supercritical water hydrothermal synthesis of nano-particles," *J. Supercritical Fluids*, 37: 209-214 (2006).
Aimable et al., "Continuous hydrothermal synthesis of inorganic nanopowders in supercritical water: Towards a better control of the process," *Powder Tech.*, 190: 99-106 (2009).
Int'l Search Report and Written Opinion issued in PCT/FR2010/051520 (2010).

* cited by examiner

*Primary Examiner* — Steven Bos
(74) *Attorney, Agent, or Firm* — Knobbe, Martens, Olson & Bear, LLP

(57) ABSTRACT

The present invention relates to a method for continuously preparing mineral particles by means of the thermolysis of mineral precursors in an aqueous medium, comprising contacting: a reactive flow, including mineral precursors at a temperature lower than the conversion temperature thereof; and a heat transfer flow that is countercurrent to said reactive flow and contains water at a temperature that is sufficient to bring the precursors to a temperature higher than the conversion temperature thereof, the mixture flow that results from said reactive flow and said heat transfer flow then being conveyed into a tubular reactor, inside of which particles are formed by gradually converting the precursors, and where the reactive flow and the heat transfer flow are placed in contact with each other inside a mixing chamber, inside of which the reactive flow and the heat transfer flow are fed by supply pipes having outlet cross-sections that are smaller than the maximum cross-section of said mixing chamber. The invention also relates to a device for implementing said method.

19 Claims, 2 Drawing Sheets

PARTICLE SYNTHESIS BY MEANS OF THE THERMOHYDROLYSIS OF MINERAL PRECURSORS

CROSS REFERENCE TO RELATED APPLICATIONS

This application is a U.S. nationalization under 35 U.S.C. §371 of International Application No. PCT/FR2010/051520, filed Jul. 20, 2010, which claims priority to French application no. FR 0955023, filed Jul. 20, 2009. The disclosures set forth in the referenced applications are incorporated herein by reference in their entireties.

BACKGROUND

The present invention relates to the field of particle synthesis, and more specifically that of the synthesis of particles having controlled dimensions, in particular nanometric dimensions (for example smaller than 500 nm, and in particular smaller than 100 nm), in particular smaller than 50 nm, or even 20 nm).

More specifically, the invention relates to a method for continuously preparing mineral particles, of the type implementing the thermolysis of the mineral precursors in an aqueous medium, and which can in particular be used for an industrial production.

The term "mineral precursor," as it is used in this description, designates a chemical species, generally mineral or organometallic, preferably soluble or dispersible in an aqueous medium, which, when subjected to a thermal treatment in an aqueous medium, is converted into another chemical species, of a mineral nature, that is capable of forming solid mineral particles, through nucleation and growth, within the aqueous medium.

A number of precursors of this type are known, which most often lead, through thermolysis in an aqueous medium, to metal oxide-, metal oxyhydroxide- and/or metal-based particles. Examples of such mineral precursors are certain hydrosoluble metallic salts of transition metals or lanthanides (for example, non-limitingly, nitrates or sulfates, such as $ZrO(NO_3)_2$, $Zn(NO_3)_2$ or $Fe_2SO_4$, which are converted by thermolysis in an aqueous medium into zirconium, zinc or iron oxide-based particles, respectively). Aside from these metallic salts, various other precursors have been described, in particular organometallic compounds, such as for example bis(ammoniolacto)dihydroxytitanium $(CH_3CH(O)COONH_4)_2Ti(OH)_2$, which is converted into titanium oxide-based particles by means of thermolysis in an aqueous medium.

In certain cases, the precursors used can be species formed in situ, just before their conversion into particles, such as for example the hydroxides of transition metals or lanthanides (in particular iron or zinc hydroxides, obtained through the in situ reaction of a corresponding metallic salt (nitrate or sulfate, for example) and a Brønsted base (typically NaOH, KOH or $NH_4OH$).

For mineral precursors of the aforementioned type, it is possible to define a threshold temperature, which will hereafter be referred to as the "conversion temperature," beyond which the mineral precursors are converted into mineral particles. The conversion temperature of a given precursor generally varies with the pressure.

Advantageously, the conversion of the mineral precursors into mineral particles takes place in water in the supercritical state, i.e. a temperature above 374° C. and a pressure above 221 bar (22, $1.10^6$ Pa), which makes it possible, among other advantages, to decrease the reaction time.

Different methods have been described to prepare particles by means of the thermolysis in an aqueous medium of mineral precursors of the aforementioned type, which often have the drawback of not leading to particles having homogenous sizes, compositions and morphologies.

In this context, methods have in particular been known for some time conducted by batches (i.e. in batch reactors). In these methods, most often, the reagents generally start to react as of the pressurization and heating up time of the reactor, which leads to a non-homogenous reaction and therefore disparities in the composition, size and/or morphology of the synthesized particles.

More recently, continuous implementation methods have been developed, in which a liquid flow comprising the mineral precursors is injected into a chamber brought to a temperature above the conversion temperature of the precursors. On this subject, one may in particular refer to the article by Arai et al. in J. Am. Ceram. Soc., vol. 75(4) pp 1019-1022 (1992), which describes a synthesis of this type making it possible to prepare metal oxide-based particles. The solution proposed by these methods conducted continuously certainly avoids a premature reaction of the reagents, but it is generally not sufficient to obtain completely homogenous synthesis conditions allowing the synthesis of particles with a homogenous composition, size and morphology. Among other difficulties, the particles obtained tend to pile up.

Alternatively, proposed by Lester et al. in the Journal of Supercritical Fluids, vol. 37, pp 209-214 (2006) is a particle synthesis where the thermolysis of the precursors is done by putting in contact, within a tubular reactor: (i) a first flow comprising mineral precursors; and (ii) a second, countercurrent flow comprising water at a temperature above the conversion temperature of the precursors. In this type of method, the injection of the flow of water raises the temperature of the medium conveyed in the tubular reactor, and, downstream of the injection point, the particles form through gradual conversion of the precursors. Here again, the synthesis conditions are generally not homogenous enough to allow the formation of particles with a homogenous composition, size and morphology. In particular, an entire zone downstream of the injection point exists where the temperature and composition of the reactive mixture are difficult to control.

SUMMARY

One aim of the present invention is to provide a method for the synthesis of mineral particles from mineral precursors in an aqueous medium that is improved relative to the aforementioned methods, and that makes it possible, at a reasonable cost, to synthesize particles with a homogenous and controlled composition, size and morphology. In this context, the invention in particular aims to provide a method making it possible to synthesize particles with a controlled and homogenous size, composition and morphology preferably having sizes smaller than 500 nm, and more particularly smaller than 100 nm.

To that end, the present invention proposes to implement the countercurrent technique of the type disclosed in the aforementioned article from the Journal of Supercritical Fluids, vol. 37, pp 209-214 (2006), but by more specifically putting flows countercurrent to one another in contact within a mixing chamber making it possible to obtain homogenous particle synthesis conditions in a shorter period of time.

More specifically, according to a first aspect, the present invention relates to a method for continuously preparing mineral particles by means of the thermolysis of mineral precursors in an aqueous medium, comprising contacting: [0015] a first flow, hereafter the reactive flow, including mineral precursors at a temperature lower than the conversion temperature thereof, and a second flow, hereafter called a heat transfer flow, that is countercurrent to said reactive flow and containing water at a temperature that is sufficient to bring the precursors to a temperature higher than the conversion temperature thereof, the mixture flow that results from mixing those two flows then being conveyed into a tubular reactor (downstream of the mixing chamber), inside of which particles are formed by gradually converting the precursors, and where the reactive flow and the heat transfer flow are placed in contact with each other inside a mixing chamber, the reactive flow being injected into said chamber by at least one first supply pipe and the heat transfer flow being injected into said chamber, countercurrent to the first flow, by a second supply pipe, and said mixing chamber having a maximum cross-section larger than the outlet cross-section of each of said supply pipes of said chamber.

According to a second aspect, the present invention also relates to a device for implementing the aforementioned method, comprising:

a tubular reactor capable of performing the particle synthesis by means of the thermolysis of mineral precursors in an aqueous medium; and in fluid contact with said tubular reactor, a mixing chamber in which emerge:

at least one first supply pipe of the chamber capable of conveying a flow comprising the mineral precursors;

a second supply pipe of the chamber making it possible to convey a flow countercurrent to the flow conveyed by the first pipe, and capable of conveying a heat transfer fluid, where the mixing chamber has a maximum cross-section that is larger than the outlet cross-section of each of said supply pipes.

The work that has been done by the inventors in the context of the present invention has made it possible to establish that by implementing a mixing chamber as defined above, one obtains, within that mixing chamber, heating up and homogenization of the reactive medium in a very short time, which makes it possible, unlike the methods of the prior art, to make the mineral precursors go extremely quickly from temperature and pressure conditions in which they are stable, or substantially stable (upstream of the reaction chamber, where they are at a temperature below their conversion temperature), to homogenous and defined stationary synthesis conditions (at the outlet of the mixing chamber, where the medium has a homogenous composition and temperature).

The particular synthesis conditions of the inventive method then enable an extremely subtle control of the end of growth of the particles that was not possible with the aforementioned methods.

Furthermore, the specific implementation of the mixing chamber inhibits the premature appearance of any seeds capable of leading to the formation of particles before the desired synthesis process.

To further optimize the mixing effect implemented in the present invention, according to one preferred embodiment of the invention, the mixing chamber can advantageously be fed by at least two supply pipes other than the supply pipe through which the heat transfer flow is injected countercurrent, at least one of which conveys the reactive flow. According to this embodiment, the mixing chamber is fed by at least three supply pipes, which further accentuates the mixing effects within that chamber and makes it possible to further reduce the time needed to obtain a homogenous particle synthesis medium. Preferably, the mixing chamber is fed by no more than five supply pipes other than the supply pipe through which the heat transfer flow is injected countercurrent. In fact, beyond that, actual mixing becomes difficult within the mixing chamber. Preferably, the mixing chamber implemented in the inventive method is fed by 2, 3 or 4 supply pipes other than the supply pipe through which the heat transfer flow is injected countercurrent, at least one of which conveys the reactive flow.

The embodiment of the invention where the mixing chamber is fed by at least three supply pipes is in particular adapted to the case where the mineral precursors used for the particle synthesis can be obtained through the reaction of several reagents (for example precursors of the metal hydroxide type, which can be obtained through the reaction of a metallic salt and a Brønsted base).

In this scenario, according to a first interesting alternative of the invention, the chamber can advantageously be fed by at least two supply pipes each conveying one of the reagents, excluding the other reagents. According to this specific alternative, the precursor is formed in situ within the mixing chamber and the "reactive flow" within the meaning of this description then refers to all of the flows of reagents leading to the formation of the precursor within the mixing chamber.

According to this alternative of the invention, the chamber can for example be fed by:

a first supply pipe conveying an aqueous solution of a salt of a transition metal or a lanthanide (such as a solution of a hydrosoluble nitrate or sulfate, for example $ZrO(NO_3)_2$, $Zn(NO_3)_2$ or $Fe_2SO_4$);

a second supply pipe conveying a solution of a Brønsted base (such as NaOH, KOH or $NH_4OH$); and [0034] a third supply pipe conveying the heat transfer fluid.

According to one embodiment compatible with the embodiments previously described, the mixing chamber includes, in addition to the feed pipes conveying the reactive flow and the heat transfer flow, at least one additional supply pipe through which water is injected, this water injection preferably being done countercurrent to the reactive flow. In this scenario, the chamber is fed by one or more feed pipes conveying the reactive flow, one or more feed pipes conveying water, and a supply pipe for the heat transfer fluid. Thus, here again, the mixing chamber is fed by at least three feed pipes, which optimizes the mixing within that chamber and makes it possible to obtain a homogenization of the temperature and composition of the reactive medium within the chamber in a very reduced period of time.

Advantageously, in all of the embodiments of the invention wherein the mixing chamber is fed by three or more supply pipes, all of the flows conveyed by the different supply pipes feeding the mixing chamber are cocurrent, with the exception of the heat transfer flow, which is countercurrent to all of the other flows introduced into the chamber, which further optimizes mixing.

Furthermore, irrespective of the exact embodiment of the inventive method, it is preferable for the geometry and size of the mixing chamber to be optimized to allow the fastest and most efficient possible mixing of the reactive and heat transfer flows within said chamber.

To that end, it is in particular preferable for the entire inner surface of the mixing chamber used in the context of the present invention to be concave, i.e. any segment defined by two points of the inner surface of the mixing chamber does not intersect the surface of the mixing chamber. Still more preferably, it is desirable, as much as possible, for the inner surface of the mixing chamber not to have angular parts or protrusions. Such a geometry of the inner surface of the mixing chamber inhibits the formation of retention areas, which makes it possible to (i) limit the residence time of the reagents in the mixing chamber, thereby preventing premature particle growth in the mixing chamber; and (ii) inhibit trapping phenomena of part of the flow within the chamber, which makes it possible to obtain a homogenous composition at the outlet of the chamber, and therefore, in fine, particles with a homogenous and controllable composition, morphology and size.

Thus, according to a first particularly interesting embodiment, the inner surface of the mixing chamber is in the shape of a sphere portion, for example a hemisphere. Alternatively, the inner surface of the mixing chamber can assume a paraboloid, semi-ellipsoid, or ovoid shape.

Furthermore, it is preferable for the supply pipe conveying the countercurrent heat transfer flow to be a cylindrical tube having, at its outlet, an inner diameter that widens from the inside toward the outside of the tube, which again optimizes mixing in the chamber, while avoiding any retention areas in the chamber. Preferably, the end of the supply pipe conveying the heat transfer flow has a so-called "conical nose" geometry, of the type obtained by machining the end of the tube using a cutter head in the shape of a revolving cone whereof the angle between the axis and the generatrix is advantageously comprised between 10° and 80°, preferably between 30° and 60°.

According to one preferred embodiment of the invention, the inner space of the tubular reactor used to prepare the particles assumes the shape of a cylinder whereof one end is covered by a cap (in a single piece with the cylinder or, more often, fastened thereon), and where:
the supply pipe(s) conveying the reactive flow emerge(s) in the cap; and
the supply pipe conveying the heat transfer flow is located within the cylindrical tubular reactor (it generally extends axially along the cylinder) and emerges at the end area of the reactor provided with the cap.

According to this embodiment, the mixing chamber for the reactive and heat transfer flows is made up of the end area of the tubular reactor provided with the cap.

The mixture flow resulting from the mixing obtained in that chamber is then conveyed into the reactor toward the other end.

According to this embodiment, for the reasons mentioned above in this description, the inner surface of the assembly of the cylindrical reactor provided with its cap is preferably completely concave, advantageously without angular parts or asperities. In particular, it is desirable according to the invention for the connection between the cap and the cylindrical reactor to be done without recesses.

Advantageously, according to this embodiment, the cap has a hemispherical shape, and the supply pipe conveying the heat transfer flow that is located within the cylinder emerges in the inner space of the cylindrical reactor (i.e. below the circle defining the contact area between the cylindrical tubular reactor and the cap) and not in the cap, preferably substantially at the shared axis of the cylindrical tubular reactor and the hemispherical cap. In that case, it is preferable for the ratio of the distance between the end of the supply pipe conveying the heat transfer fluid that emerges in the cylindrical reactor and the bottom of the cap, relative to the inner diameter of the cylindrical reactor, to be comprised between 0.5 and 1.5, preferably between 0.8 and 1.2.

Furthermore, according to this embodiment, it is preferable for the ratio of the outer diameter of the supply pipe conveying the heat transfer fluid relative to the inner diameter of the cylindrical tubular reactor to be greater than 0.5, this ratio typically being comprised between 0.5 and 0.8.

On the other hand, according to this embodiment, it is preferable for at least two supply pipes (typically two, three or four, and preferably two or three) to emerge in the cap defining the mixing chamber, at least one of which conveys the reactive flow. In that case, the distance between the outlets of the supply pipes that emerge in the cap and the angle that each of those supply pipes forms with the axis of the cylindrical tubular reactor can advantageously be adapted so as to optimize the mixing of the flows produced in the chamber. In that context, as a general rule, it proves advantageous for the ratio of the distance between the outlets of the supply pipes that emerge in the cap relative to the inner diameter of the cylindrical tubular reactor to be comprised between 0.2 and 0.9 and for each of the supply pipes that emerge in the cap to form, with the axis of the cylindrical tubular reactor, an angle comprised between 15.degree. and 90.degree.

As a general rule, it is preferable, for small ratios of the distance between the outlets of the supply pipes that emerge in the attached cap to the inner diameter of the cylindrical tubular reactor (in particular when that ratio is in the vicinity of 0.2 to 0.4), for the angle formed by said supply pipes with the axis of the cylindrical tubular reactor to be as small as possible (typically in the vicinity of 15 to 30°). Conversely, for high ratios, it will be interesting for the angle to be higher, for example between 60 and 90°. Between these extremes, it is within the competence of one skilled in the art to adapt the geometry of the mixing chamber to optimize the mixing conditions of the flows in that chamber.

Furthermore, in particular so as to inhibit clogging phenomena at the outlet of the reactor, it is preferable for the end of the tubular reactor in which the formation of the particles takes place to be provided with a discharge pipe having an inner diameter larger than the inner diameter of the supply pipe conveying the heat transfer flow. Furthermore, it is generally desirable for the discharge pipe at the outlet of the tubular reactor to form an angle comprised between 60° and 90° with the axis of the tubular reactor.

Other parameters of the method and the reactor can also be optimized in the context of the present invention.

In this context, in particular, it should be noted that it often proves advantageous for the tubular reactor to be provided, downstream of the mixing chamber, with means capable of ensuring that the temperature is kept at a constant or substantially constant value (typically to within +/−5° C.) around the value of the temperature obtained at the outlet of the mixing chamber, which also makes it possible to optimize the synthesis conditions and ensure control of the size, morphology and compositions of the particles.

Furthermore, it is advantageous for the different parts of the reactor implemented in the synthesis of the particles (in particular the tubular reactor) to be made from a material resistant to high pressures and temperatures, for example an alloy of the Inconel type that is capable of withstanding supercritical conditions.

BRIEF DESCRIPTION OF THE DRAWINGS

The present invention and its advantages will now be illustrated in more detail in light of the embodiments provided below, done in reference to the appended figures, where:

In FIGS. 1 and 2, a device according to the invention is shown comprising a cylindrical tubular reactor 10, typically made from Inconel, whereof the inner space, within which the gradual conversion reaction of the precursors into particles occurs in the inventive method, is shown by general reference 15.

Figure 1:
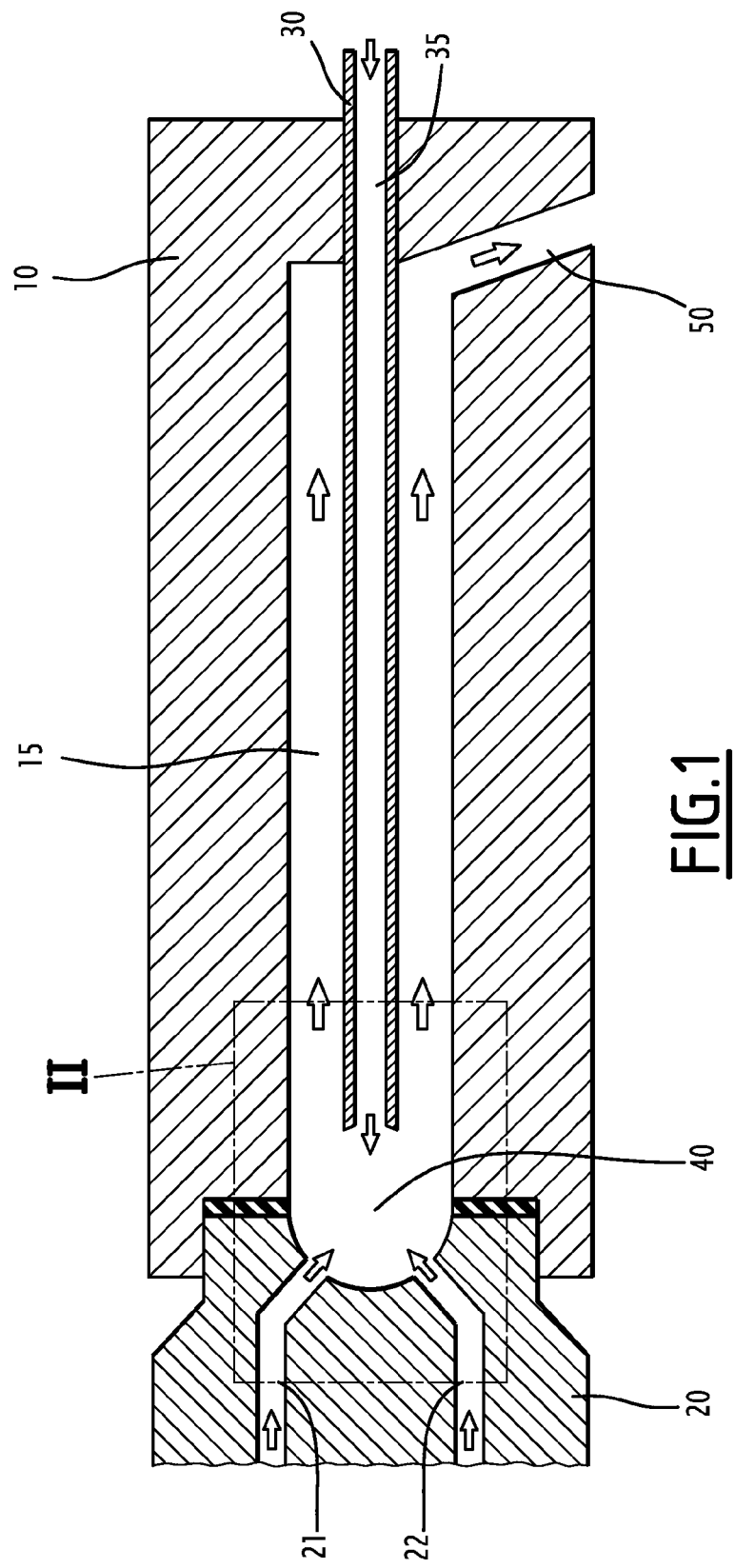
FIG. 1 is a diagrammatic cross-sectional illustration of a reactor typically usable in the context of the present invention.

This tubular reactor 10 is closed at one of its ends by a cap 20, advantageously also made from Inconel, in which the supply pipes 21 and 22 emerge, which respectively form angles α and α' with the axis of the tubular reactor 10, these angles typically being comprised between 15° and 90°, typically in the vicinity of 20° to 40° according to the illustrated example, and which are separated by a distance d that is typically such that the ratio d/b is comprised between 0.2 and 0.9 (for example between 0.2 and 0.5 in the case of the embodiment shown in the figure). At least one of these supply pipes makes it possible to convey the reactive fluid. The embodiment shown in the figure corresponds to two supply pipes, but, according to other embodiments, a different number of pipes can emerge in the cap 20, for example one, three or four. The inner surface of this cap is in the shape of a hemisphere with the same diameter as the inner diameter b of the tubular reactor 10.

Furthermore, within the inner space 15 of the tubular reactor, a supply pipe 30 making it possible to convey a heat transfer flow within the inner space 35 thereof is positioned substantially along the axis of the cylindrical tubular reactor, allowing an injection of a heat transfer flow countercurrent to the flows conveyed by the supply pipes 21 and 22.

The supply pipe 30 emerges in the end area of the reactor 10 provided with the cap 20, with a distance a between the end of the supply pipe 30 at the bottom of the cap 20 generally such that the ratio a/b is comprised between 0.8 and 1.2.

The supply pipe 30 is a cylindrical tube whereof the outlet has been machined by a conical milling head and which thereby has, at its outlet, an inner diameter that widens from the inside toward the outside of the tube, with a cone shape (so-called "nose cone" geometry) with an angle .beta. between the axis and the generatrix of the cone advantageously comprised between 30° and 60°.

Given the particular geometry of the device, a mixing chamber 40 is formed by the assembly of the cap 20 and the end area of the tubular reactor 10 provided with said cap. When flows are injected through the supply pipes 21, 22 and 30, those flows mix optimally within the chamber 40. The mixture of the heat transfer flow conveyed by the pipe 30 with the reactive flow conveyed by one and/or the other of the pipes 21 and 22 leads to a heating up and homogenization of the composition within the mixing chamber. The resulting flow mixture, which is perfectly homogenous in composition and temperature, is then pushed into the tubular reactor, where mineral particles form through gradual conversion of the precursors, homogenously and in a controlled manner. It is advantageously possible to position, along the tubular reactor, temperature sensors associated with heating means (not shown in the figure), which make it possible to keep the conditions of the reaction constant.

At the outlet of the reactor, the particles formed are recovered using an evacuation pipe 50 with an inner diameter larger than the inner diameter of the pipe 30, and which form, with the axis of the tubular reactor, an angle typically comprised between 60° and 90°. This recess of the evacuation pipe makes it possible, inter alia, to optimize the evacuation of the particles and avoid clogging phenomena by the particles at the outlet of the tubular reactor.

Figure 2:
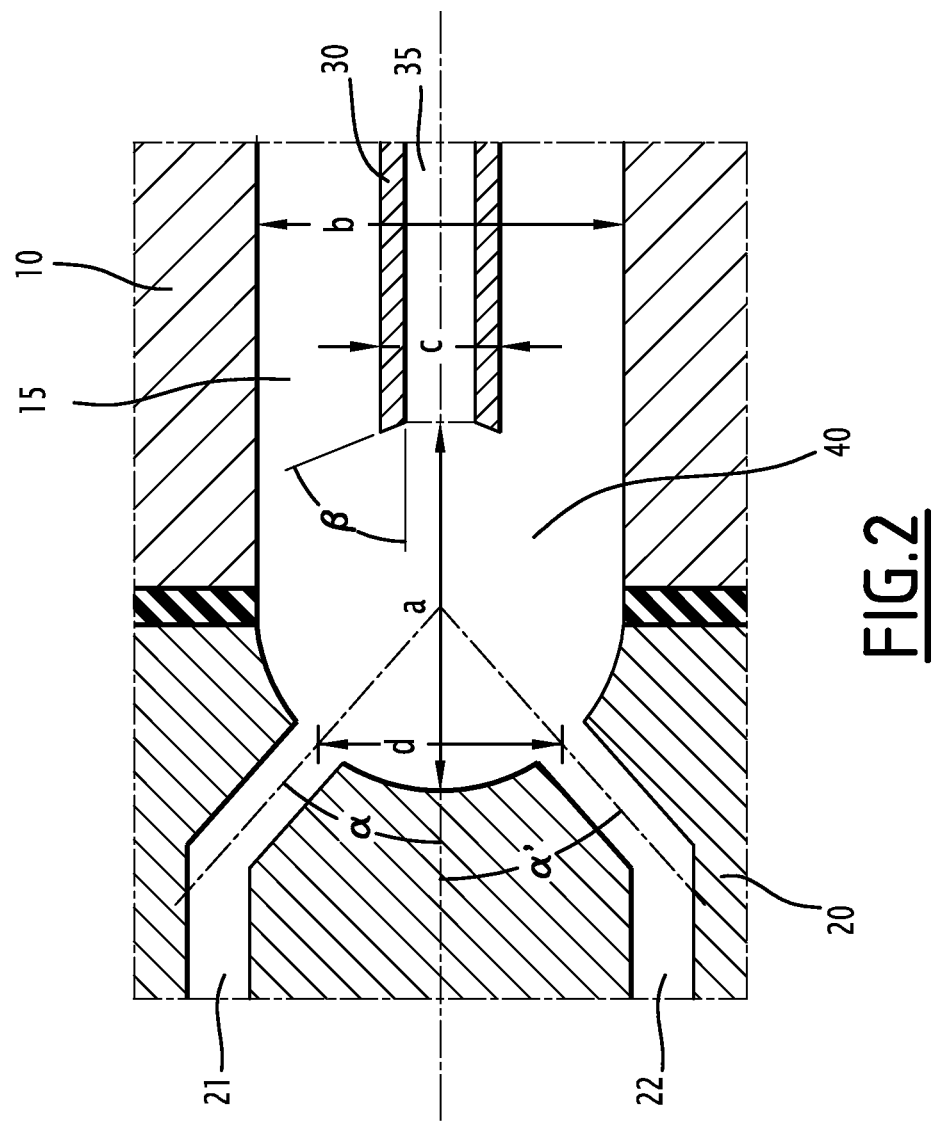
FIG. 2 is an enlarged area of the part of FIG. 1 shown by box (II) in broken lines in said FIG. 1.

A reactor of the type shown in FIGS. 1 and 2 has been effectively used by the inventors for the synthesis of zirconium, zinc and iron oxide particles and titanium particles, from $ZrO(NO_3)_2$, $Zn(NO_3)_2$, $Fe_2SO_4$ and $(CH_3CH(O)COONH_4)_2Ti(OH)_2$ precursors, respectively.

The invention claimed is:

1. A method for continuously preparing mineral particles by thermolysis of mineral precursors in an aqueous medium comprising:

(a) contacting a reactive flow with a heat transfer flow in a mixing chamber in a countercurrent manner so as to form a mixture flow, the reactive flow and the heat transfer flow being distinct flows, whereby the reactive flow includes mineral precursors selected from the group consisting of hydrosoluble metallic nitrate salts of transition metals, hydrosoluble metallic nitrate salts of lanthanides, hydrosoluble metallic sulfate salts of transition metals, hydrosoluble metallic sulfate salts of lanthanides, bis(ammoniolacto)dihydroxytitanium, hydroxides of transition metals and hydroxides of lanthanides, wherein the mineral precursors in the reactive flow are at a temperature lower than the conversion temperature of the mineral precursors into mineral particles, and the heat transfer flow contains water at a temperature that is sufficient to bring the mineral precursors to a temperature higher than the conversion temperature, (b) conveying the mixture flow of step (a) into a tubular reactor; and (c) forming particles from the mixture flow of step (b) by gradually converting the mineral precursors into particles, wherein the mixing chamber is fed by at least two supply pipes, wherein the reactive flow is injected into the mixing chamber by at least one of the at least two supply pipes in the mixing chamber and the heat transfer flow is injected into the mixing chamber, countercurrent to the reactive flow, by a third pipe, and wherein the mixing chamber has a maximum cross-section larger than the outlet cross-section of each of the at least two supply pipes and the third pipe.

2. The method according to claim 1, wherein the mineral precursors are obtained through the reaction of several reagents with one another, and wherein the mixing chamber is fed by at least two supply pipes each conveying one of the several reagents, excluding the other reagents.

3. The method according to claim 1, where, in addition to the feed pipes conveying the reactive flow and the heat transfer flow, the mixing chamber comprises at least one additional supply pipe through which water is injected.

4. The method according to claim 1, wherein the entire inner surface of the mixing chamber is concave.

5. The method according to claim 4, wherein the inner surface of the mixing chamber is in the shape of a sphere.

6. The method according to claim 1, wherein the supply pipe conveying the countercurrent heat transfer flow is a cylindrical tube having, at its outlet, an inner diameter that widens from the inside toward the outside of the tube.

7. The method according to claim 1, wherein the inner space of the tubular reactor used to prepare the particles is in the shape of a cylinder where on end is covered by a cap, and wherein the supply pipe(s) conveying the reactive flow emerge(s) in the cap; and the supply pipe conveying the heat transfer flow is located in the inner space of the cylindrical tubular reactor and emerges at the end area of the reactor provided with the cap, through which said end area of the reactor provided with the cap comprises a mixing chamber for the reactive flow and heat transfer flow.

8. The method according to claim 7, wherein the inner surface of the assembly of the cylindrical reactor provided with its cap is completely concave.

9. The method according to claim 8, wherein the cap has a hemispherical shape, and wherein the supply pile conveying the heat transfer flow that is located within the cylinder emerges in the inner space of the cylindrical reactor and not in the cap.

10. The method according to claim 7, wherein a ratio (c/b) of the outer diameter (c) of the supply pipe conveying the heat transfer fluid relative to the inner diameter (b) of the cylindrical tubular reactor is greater than 0.5.

11. The method according to claim 1, where the end of the tubular rector in which the formation of the particles takes place is provided at the outlet with an evacuation pipe with an inner diameter larger than the inner diameter of the supply pipe conveying the heat transfer flow.

12. The method of claim 1, wherein the inner surface of the mixing chamber is free of angular parts.

13. The method of claim 7, wherein the inner surface of the assembly of the cylindrical reactor provided with its cap is free of angular parts.

14. The method of claim 4, wherein the inner surface of the mixing chamber is in the shape of a hemisphere.

15. The method of claim 8, wherein the supply pipe conveying the heat transfer flow that is located within the cylinder emerges at the shared axis of the cylindrical tubular reactor and the hemispherical cap.

16. The method of claim 7, wherein the ratio (c/b) of the outer diameter (c) of the supply pipe conveying a heat transfer fluid relative to the inner diameter (b) of the cylindrical tubular reactor is between 0.5 and 0.8.

17. The method of claim 11, wherein the evacuation pipe at the outlet of the tubular reactor forms an angle between 15° and 90° with respect to the axis of the tubular reactor.

18. The method according to claim 1, wherein an evacuation pipe at the outlet of the tubular reactor forms an angle between 15° and 90° with respect to the axis of the tubular reactor.

19. The method according to claim 4, wherein the inner surface of the mixing chamber is in the shape of a hemisphere.

* * * * *